(12) United States Patent
Beck et al.

(10) Patent No.: US 11,028,935 B2
(45) Date of Patent: Jun. 8, 2021

(54) VALVE AND ELECTRIC ACTUATOR HOUSING

(71) Applicant: Robert Bosch GmbH, Stuttgart (DE)

(72) Inventors: Thorsten Beck, Graefendorf (DE);
Claus Schneider, Burgsinn (DE);
Johannes Wolf, Rechtenbach (DE);
Klaus Hoefling, Lohr (DE); Matthias Gernert, Frammersbach (DE); Reiner Vaethjunker, Partenstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/423,577

(22) Filed: May 28, 2019

(65) Prior Publication Data
US 2019/0368626 A1    Dec. 5, 2019

(30) Foreign Application Priority Data

May 30, 2018  (DE) ..................... 10 2018 208 614.1

(51) Int. Cl.
| | | |
|---|---|---|
| *F16K 31/02* | (2006.01) | |
| *F16K 27/04* | (2006.01) | |
| *H01R 13/52* | (2006.01) | |
| *F16K 27/00* | (2006.01) | |
| *F15B 13/08* | (2006.01) | |
| *F16K 37/00* | (2006.01) | |
| *F15B 13/06* | (2006.01) | |
| *F16K 31/06* | (2006.01) | |

(52) U.S. Cl.
CPC ............ *F16K 31/02* (2013.01); *F15B 13/086* (2013.01); *F15B 13/0853* (2013.01); *F15B 13/0857* (2013.01); *F15B 13/0875* (2013.01); *F16K 27/003* (2013.01); *F16K 27/048* (2013.01); *F16K 37/0041* (2013.01); *H01R 13/5202* (2013.01); *F15B 13/06* (2013.01); *F15B 13/08* (2013.01); *F15B 13/0846* (2013.01); *F16K 31/0613* (2013.01); *Y10T 137/8242* (2015.04); *Y10T 137/86614* (2015.04); *Y10T 137/86622* (2015.04)

(58) Field of Classification Search
CPC .. F16K 27/00; F16K 27/048; Y10T 137/8242; Y10T 137/86614; Y10T 137/86622; H01R 13/113; H01R 13/18; H01R 13/5202; F15B 13/06; F15B 13/08; F15B 13/0846; F15B 13/0853; F15B 13/0857; F15B 13/086; F15B 13/0875; H01F 27/022
See application file for complete search history.

(56) References Cited

U.S. PATENT DOCUMENTS 5,179,343 A *  1/1993  Chishima ............... G01R 31/69
                                                            324/538
5,588,465 A * 12/1996  Witowski ............ F15B 13/0402
                                                           137/596.16

(Continued)

*Primary Examiner* — Matthew W Jellett
(74) *Attorney, Agent, or Firm* — Maginot, Moore & Beck LLP

(57) ABSTRACT

A valve has a valve housing which is connected to an electronics unit. The electronics unit has an electronics unit housing which has an aperture in order to establish electrical contacting with an actuator of the valve. A portion of the actuator may protrude into the aperture. Here, play is provided between the aperture and the portion of the actuator.

12 Claims, 6 Drawing Sheets

(56) References Cited

U.S. PATENT DOCUMENTS

| | | | | |
|---|---|---|---|---|
| 5,758,931 | A * | 6/1998 | Hio | B60R 16/0238 |
| | | | | 303/113.1 |
| 5,806,565 | A * | 9/1998 | Kadlicko | F15B 13/0402 |
| | | | | 137/625.63 |
| 5,938,486 | A * | 8/1999 | Durand-Cochet | H01R 13/432 |
| | | | | 439/745 |
| 6,164,335 | A * | 12/2000 | Hayashi | F15B 13/0817 |
| | | | | 137/884 |
| 6,170,527 | B1 * | 1/2001 | Hayashi | F15B 13/0817 |
| | | | | 137/269 |
| 6,520,202 | B2 * | 2/2003 | Miyazoe | F15B 13/0402 |
| | | | | 137/554 |
| 6,591,865 | B2 * | 7/2003 | Misumi | F15B 13/0402 |
| | | | | 137/554 |
| 6,990,999 | B2 * | 1/2006 | Patel | F15B 13/0814 |
| | | | | 137/596.16 |
| 7,070,161 | B2 * | 7/2006 | Piehl | F15B 13/044 |
| | | | | 137/554 |
| 10,050,373 | B2 * | 8/2018 | Wang | H01R 13/426 |
| 10,167,962 | B2 * | 1/2019 | Itoh | F16K 31/426 |
| 10,320,129 | B2 * | 6/2019 | Ramunno | H01R 13/688 |
| 10,724,662 | B2 * | 7/2020 | Hoevel | F16K 11/07 |
| 2019/0372259 | A1 * | 12/2019 | Schneider | H01R 13/113 |
| 2020/0063881 | A1 * | 2/2020 | Sagayama | F16K 27/048 |

* cited by examiner

VALVE AND ELECTRIC ACTUATOR HOUSING

This application claims priority under 35 U.S.C. § 119 to patent application number DE 10 2018 208 614.1, filed on May 30, 2018 in Germany, the disclosure of which is incorporated herein by reference in its entirety.

BACKGROUND

The disclosure relates to a valve having a valve housing in which a valve element is movably arranged. An electronic actuator is provided for the actuation of the valve element. The valve is furthermore electronically controlled by means of an electronics unit.

From the prior art, hydraulic valves are known which have a valve housing with a displaceable valve slide. The valve slide is actuatable by means of one or more actuators, for example in the form of electromagnets. An electronics unit is provided for the electrical contacting and control of the actuators. For the connection of an actuator to the electronics unit, said actuator has blade contacts. A cubiform plug connector is then mounted onto the blade contacts, which plug connector produces the electrical connection to the electronics unit. Such plug connectors are presented for example in the standard DIN EN 175 301-803:2006.

SUMMARY

By contrast to this, it is the object of the disclosure to create a valve which has an actuator and an electronics unit and which is of simple and inexpensive design in terms of apparatus.

Said object is achieved according to the features disclosed herein.

The following description relates to advantageous refinements of the disclosure.

According to the disclosure, a valve, in particular hydraulic valve, is provided. Said valve preferably has a valve housing in which a valve element, in particular in the form of a valve slide, is movably arranged. The valve element is for example actuatable by means of at least one electronic actuator or magnet. The actuator is preferably fixed to the valve housing. An electronics unit may be provided for the electronic control of the valve. The electronics unit is for example arranged in an electronics unit housing. The electronics unit housing may have a housing pedestal by means of which it is then fastenable to the valve housing, in particular to a valve housing side pointing approximately radially away from the valve slide. The housing pedestal has, for example, at least one housing aperture via which the actuator is then connected to the electronics unit. The housing aperture may, in particular as viewed in a radial direction of the valve slide, be provided in a simple manner opposite the actuator, in particular opposite contacts of the actuator. It is preferable for play in a longitudinal direction of the valve slide and/or in a transverse direction with respect to the valve slide to be provided between the housing aperture and a component, or components, arranged within the housing aperture.

This solution has the advantage that, even though the electronics unit housing is connected to the valve housing, a tolerance compensation at least in the region of the housing aperture is made possible in a simple and inexpensive manner in terms of apparatus. For example, if cables or other electrical components and/or one or more parts or portions of the actuator are provided in the interior of the housing aperture, then the play advantageously has the effect that, despite manufacturing tolerances, no collision occurs between said component(s) and the electronics unit housing. In other words, a free space is formed in an axial direction between the housing aperture and a component or multiple components provided within the housing aperture, in order to compensate manufacturing tolerances.

In a further refinement of the disclosure, the actuator has an actuator housing which for example protrudes in certain portions into the housing aperture. It is thus firstly possible for the electronics unit housing to be installed extremely close to the valve housing, and secondly, it is possible for the actuator housing to be the component which then has play at least in a longitudinal direction relative to the housing aperture.

In a preferred refinement of the disclosure, a travel sensor may be provided which is fastened to an actuator housing of the actuator or to the actuator housing of the actuator or to an actuator housing of a further actuator or to the valve housing. Furthermore, the travel sensor may be arranged axially on the valve as viewed in a longitudinal direction of the valve slide. The housing pedestal of the electronics unit housing then preferably has a further housing aperture. Via the latter, the travel sensor can then be connected to the electronics unit. Furthermore, it is preferably possible for the housing aperture to be arranged opposite the travel sensor, in particular as viewed in a radial direction of the valve slide. The travel sensor can thus be contacted with the electronics unit in a simple and compact manner in terms of apparatus. The housing aperture or the housing apertures are thus preferably formed in the region of the respective contacting with the actuator or the actuators or the travel sensor.

In a further refinement, a centering element may be provided on the travel sensor or on the sensor housing of the travel sensor. Said centering element preferably engages into the further housing aperture, which is provided for the travel sensor. Here, the engagement may be such that the electronics unit housing is axially fixed and/or centered in a longitudinal direction of the valve slide and/or in a transverse direction of the valve slide. In other words, the housing aperture is designed such that the electronics unit housing is axially fixed there. Thus, axial fixing and/or centering of the electronics unit housing can be realized via the further housing aperture, whereas play is provided in the case of the other housing aperture.

In other words, the housing pedestal of the electronics unit housing is screwed onto the valve housing and has at least two apertures for the connection of the travel sensor and for the connection of one or both magnets.

In a preferred embodiment of the disclosure, a ring-shaped seal may be provided which is preferably supported, in particular from the outside, on the housing pedestal, surrounds or engages around the housing aperture, and is furthermore supported, in particular entirely, on the actuator or on the actuator housing. The seal can thus be provided in a simple manner between the housing pedestal and the actuator in order to seal off the housing aperture and thus in order to seal off the electrical contacting.

In a preferred solution, the seal may bear against a pedestal base portion of the housing pedestal. The pedestal base portion may in this case, for example, extend parallel and with a spacing with respect to the longitudinal axis of the valve slide and/or point toward the actuator. Preferably, the pedestal base portion engages around the housing aperture and forms an abutment surface for the seal. Here, the abutment surface is configured in such a way, in particular is of such a size, that the seal bears, in particular entirely, against the abutment surface throughout the entire provided play or tolerance range in order to seal off the housing aperture. Thus reliable sealing is made possible in a simple manner in terms of apparatus despite play or a tolerance range.

For example, in a further refinement of the disclosure, the housing aperture is of stepped form. Viewed from the outside, the housing aperture has, for example, a first, in particular cylindrical, step and an adjoining second, in particular cylindrical, step with a smaller diameter. The abutment surface of the pedestal base portion may then be an inner ring-shaped step surface between the steps. Furthermore, the part or portion of the actuator protrudes for example only into the first, large step.

For example, the actuator housing of the actuator has a connection pedestal which extends in particular radially with respect to the longitudinal axis of the valve slide. Said connection pedestal may then be surrounded by the seal. This firstly leads to simple sealing and, secondly, in this way, the seal can also be easily fixed. The connection pedestal is for example of cuboidal design. It may have a connection side which points, in particular radially, away from the actuator housing and which points towards the electronics unit housing and at which, for example, the contacts are provided.

The seal has, for example, a cylindrical sealing portion which is adjoined by an inner collar. The cylindrical sealing portion may then engage around the connection pedestal and bear with the inner collar against the connection pedestal. A displacement of the seal toward the actuator is thus limited by the inner collar. The seal can thus be supported on the actuator in a radial direction with respect to the longitudinal axis of the valve. In other words, the seal is of bushing-like form, wherein the bushing base has a through-extending aperture.

On a collar side pointing away from the connection pedestal, in particular pointing radially outward, of the inner collar, and/or, in particular at the outside, on the cylindrical sealing portion, there may be formed at least one encircling sealing lip. The latter may then be supported on the housing pedestal, in particular on the pedestal base portion, of the electronics unit housing. The sealing lip has, for example, a hollow cylindrical cross section. It is also conceivable for the sealing lip to be of approximately C-shaped or U-shaped design as viewed in cross section, wherein said sealing lip may be connected by means of a limb end portion to the seal. The opening of the sealing lip then points, for example, toward or away from the inner collar and/or toward or away from the cylindrical sealing portion. It is alternatively or additionally conceivable for the opening of the sealing lip to point radially inward or outward with respect to the seal. It is furthermore alternatively or additionally conceivable for the sealing lip to be of approximately T-shaped or Y-shaped design in cross section, wherein the sealing lip may then be connected by way of the main limb to the sealing portion and/or to the inner collar, and the two secondary limbs point in the direction of the electronics unit housing.

In a further refinement of the disclosure, the centering element in the case of the travel sensor may be designed as a centering sleeve or hollow cylinder which may extend radially away from the sensor housing and may protrude into the further housing aperture. Via the interior of the centering sleeve, contacting of the travel sensor is then made possible in a simple manner, or it is for example possible for cables to be lead via the interior of the centering sleeve. The centering sleeve may for example have a first encircling outer shell surface portion which bears against an inner wall of the housing aperture, in particular in both longitudinal directions of the valve slide. With a second encircling outer shell surface portion, the centering sleeve may, together with the inner wall of the housing aperture, delimit a sealing space in which a sealing means may then be introduced. For example, the centering sleeve is radially set back on its end portion pointing toward the electronics unit housing, whereby said centering sleeve has a smaller outer diameter at the end side. The cylindrical outer shell surface of the set-back portion may then have the outer shell surface portions discussed above. The outer shell surface portion for the centering of the centering sleeve is in this case preferably provided at an end side. The sealing means is, in a simple manner in terms of apparatus, a sealing ring or an O-ring seal, for example, which surrounds the centering sleeve. The housing aperture for the centering element is preferably likewise of stepped form. Here, viewed from the outside, it has for example a first inner shell surface which is adjoined, via a step surface, by a second inner shell surface which has a smaller diameter. The sealing means may then be supported on the large inner shell surface and the step surface of the housing aperture. Furthermore, the sealing means may be supported on the outer shell surface portion of the centering sleeve and on a step surface formed by the radial set-back portion of the centering sleeve.

The electronics unit preferably has a controller for the control of the position of the valve slide. It is alternatively or additionally conceivable for the controller and/or the electronics unit to be implemented as a microcontroller.

The valve preferably has two actuators, wherein a respective actuator may then be fastened to the valve housing at a respective face side, pointing in a longitudinal direction of the valve slide, of the valve housing. The travel sensor may then be fastened to a face side, pointing away from the valve housing and pointing in a longitudinal direction of the valve slide, of the actuator housing. For a respective actuator, the electronics unit housing is preferably correspondingly designed in accordance with one or more aspects as discussed above and below.

The electronics unit housing is for example arranged laterally adjacent to the valve housing and/or adjacent to the actuator housing or the actuator housings and/or adjacent to the travel sensor. The electronics unit housing is preferably screwed in a simple manner to the valve housing. In the electronics unit housing, there may for example be provided a circuit board with one or more electronic components. For the contacting of the electronics unit with the actuators and/or with the travel sensor, blade receptacles are for example provided on the electronics unit, which are then plugged onto corresponding contacts of the actuator or of the actuators and/or of the travel sensor. By contrast to the cubiform plug connector, the blade receptacles require little structural space, whereby the housing aperture can be designed to be relatively small, and thus an outlay for sealing is reduced.

In other words, at the housing aperture for the travel sensor, the seal is formed in a simple manner by means of an O-ring seal. At the further housing aperture, the seal between the connection pedestal of the magnet and the pedestal of the electronics unit housing is provided, which seal bears against a base of the further housing aperture in order to compensate play.

Sealing of the interface of the control electronics unit with respect to the actuator or sensor is thus made possible with a high degree of tolerance compensation. Furthermore, an inexpensive and assembly-compatible seal is realized. No installation of a cubiform plug connector and of a cable leadthrough is necessary.

BRIEF DESCRIPTION OF THE DRAWINGS

Preferred exemplary embodiments of the disclosure will be discussed in more detail below on the basis of schematic drawings, in which.

DETAILED DESCRIPTION

Figure 1:
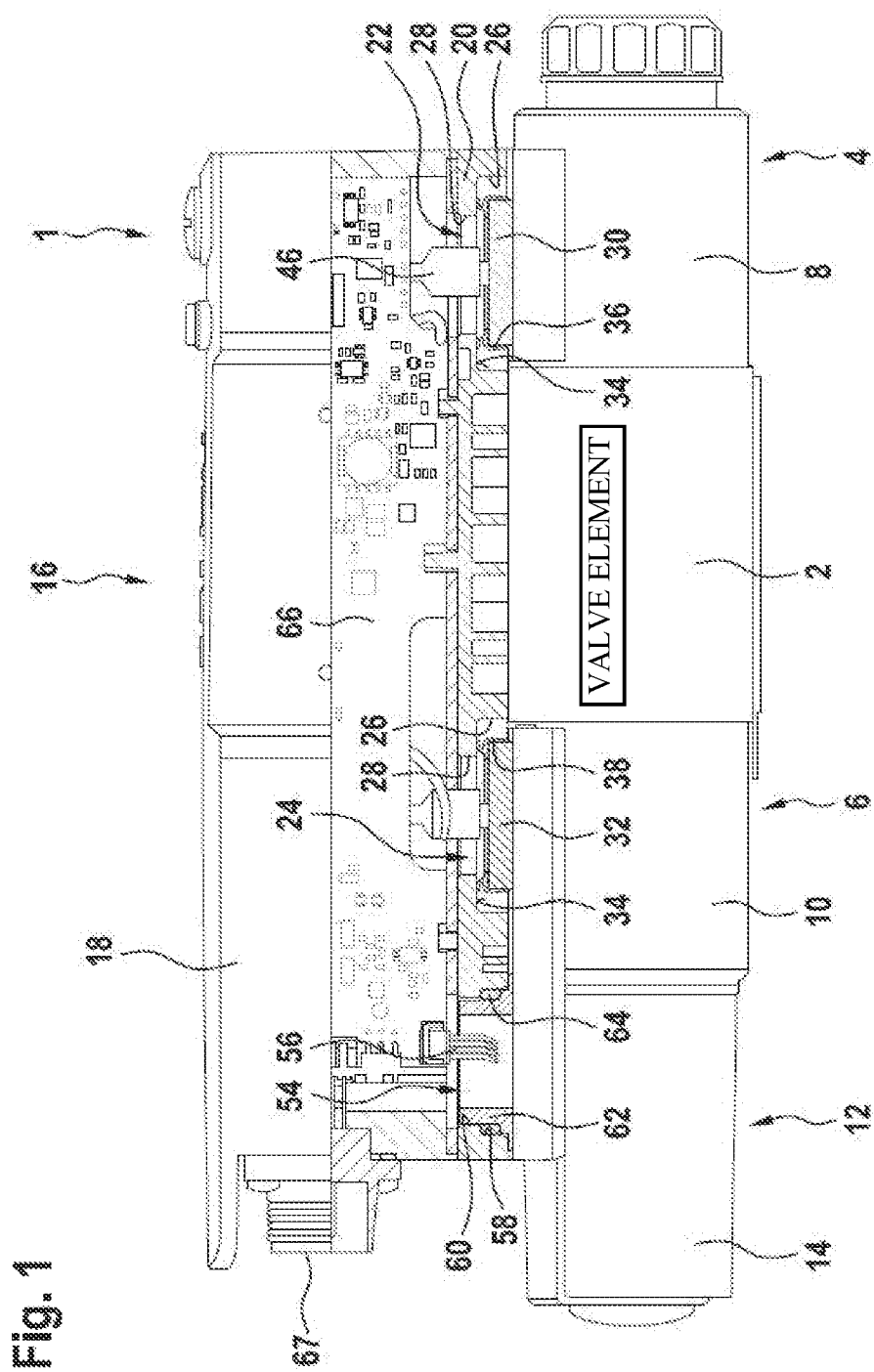
FIG. 1 shows, in a side view, the valve according to an exemplary embodiment, wherein an electronics unit housing is illustrated partially in section.

FIG. 1 illustrates a hydraulic valve 1 which has a valve housing 2 in which a valve slide (not shown) is arranged in displaceable fashion. The valve slide is actuatable by means of a first actuator 4 and a second actuator 6. The actuators 4 and 6 are fastened by means of their respective actuator housing 8 and 10 to the valve housing 2. A travel sensor 12 is provided on the left-hand actuator 6 in FIG. 1. Said travel sensor is fastened by means of its sensor housing 14 to the actuator 6. The valve 1 is, with the described components 4, 6 and 12, of elongate design. Furthermore, the valve 1 has an electronics unit 16 with an electronics unit housing 18. The electronics unit housing 18 is arranged to the side of the valve 1. Furthermore, the electronics unit housing 18 has a housing pedestal 20 by means of which it is fastened to the valve housing 2 by way of a screw connection. The housing pedestal 20 extends in certain portions along the right-hand actuator 4 in FIG. 1. In the other direction, the electronics unit housing 18 extends over the entirety of the further actuator 6 and over part of the travel sensor 12. For electrical contacting of the actuators 4 and 6, the housing pedestal 20 in FIG. 1 has a first housing aperture 22 and a second housing aperture 24. A respective housing aperture 22 and 24 is of stepped form with a first step 26 and with a second step 28 of relatively small diameter. The first step 26 as viewed from the outside is in this case designed such that a connection pedestal 30 of the actuator 4 can protrude in certain portions into said first step. The same applies to the connection pedestal 32 of the actuator 6, which protrudes in certain portions into the housing aperture 24. The connection pedestal 30 and 32 are in this case spaced apart both from the respective housing aperture 22, 24 in a radial direction and in an axial direction with respect to the longitudinal axis of the valve 1. Play is thus provided, in particular in an axial direction, between a respective connection pedestal 30 and 32 and the respective housing aperture 22, 24 in order to compensate assembly tolerances in a simple manner in terms of apparatus. Between the steps 26, 28 of a respective housing aperture 22, 24, there is formed a step surface which serves as abutment surface 34 for a respective sealing element 36 and 38 or a respective seal and which is part of a pedestal base portion of the housing pedestal 20. The respective abutment surface 34 is of approximately planar design and extends approximately parallel and with a spacing with respect to a longitudinal axis of the valve 1. The respective sealing element 36 and 38 is in this case provided between a respective connection pedestal 30 and 32 and the respective housing aperture 22 and 24.

Figure 2:
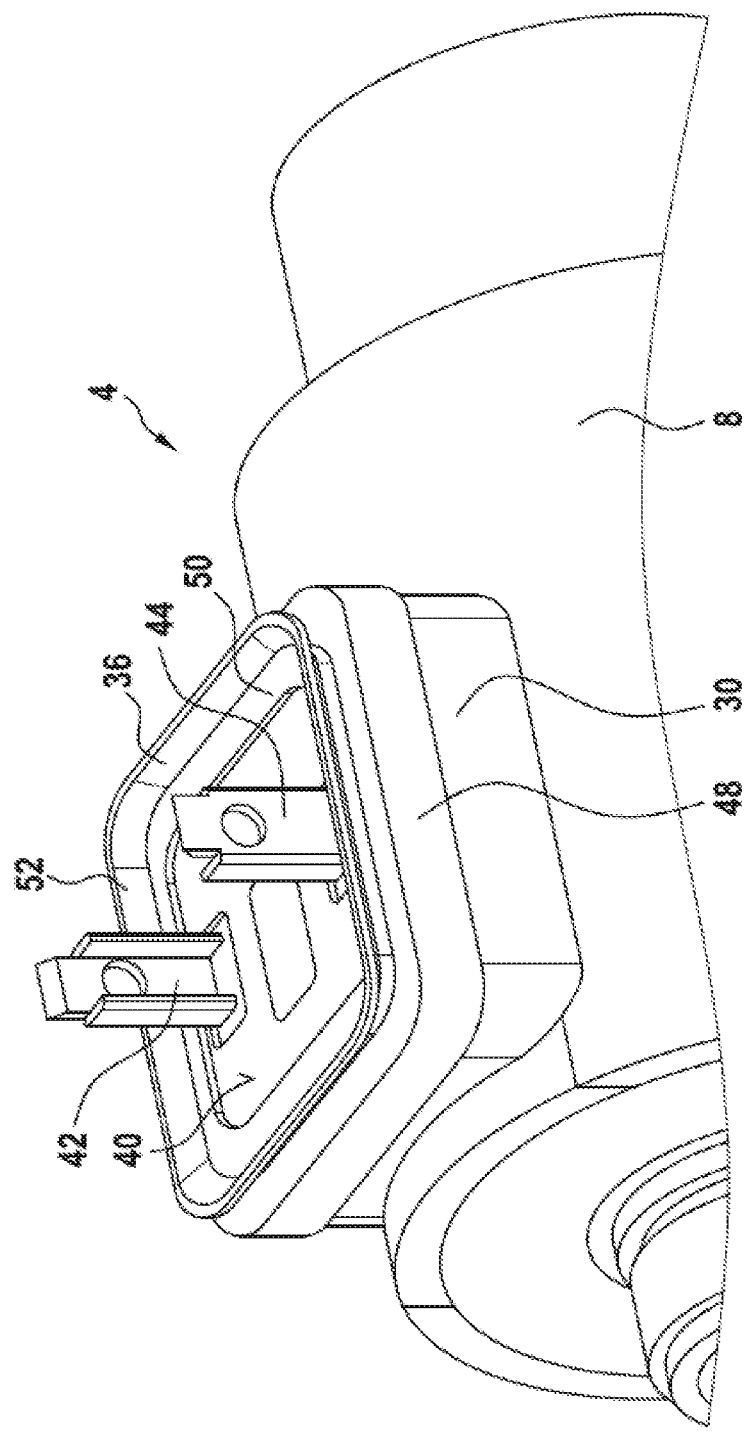
FIG. 2 is a perspective illustration of an actuator of the valve from FIG. 1.

In FIG. 2, the approximately circular cylindrical actuator housing 8 of the actuator 4 can be partially seen. The connection pedestal 30 extends approximately radially from said actuator housing. Said connection pedestal has a connection surface 40 pointing away from the actuator 4. Said connection surface is arranged approximately parallel and with a spacing to a tangential plane of the cylindrical actuator housing 8. The connection surface 40 is furthermore arranged approximately parallel and with a spacing to the abutment surface 34, see FIG. 1. Two blade contacts 42 and 44 project, parallel and with a spacing with respect to one another, from the connection pedestal 30. Said contacts are each contacted by means of a blade receptacle 46, see FIG. 1. Furthermore, the sealing element 36 can be seen in FIG. 2. Said sealing element has a cylindrical sealing portion 48 which engages sealingly around the connection pedestal 30. At an end side and at the side of the connection surface 40, an inner collar 50 is formed on the sealing portion 48, which inner collar covers the connection surface 40 in certain portions. The inner collar 50 is in this case of ring-shaped form. Furthermore, in the case of the inner collar 50, on its side pointing away from the connection surface 40, there is provided a ring-shaped sealing lip 52 which then extends approximately radially away from the actuator 4 toward the abutment surface 34, see FIG. 1. Here, the sealing lip 52 comprises the contacts 42 and 44. The sealing element 30 is then supported by means of the sealing lip 52 against the abutment surface 34, see FIG. 1. The further actuator 6 is designed correspondingly to the explanations relating to FIG. 2.

In FIG. 1, the housing pedestal 20 of the electronics unit housing 18 has a further housing aperture 54. This is provided for the electrical contacting of the travel sensor 12, as is schematically illustrated by means of a cable connection 56. The housing aperture 54 is likewise of stepped form with a first step 58 and with an adjoining second, relatively small step 60, wherein the first step 58 is provided further to the outside. A centering sleeve 62 protrudes into the housing aperture 54, which centering sleeve is formed on the travel sensor 12 and extends approximately radially away from the latter. Said travel sensor serves for the axial fixing of the electronics unit housing 18 to the valve 1. The centering sleeve 62 is radially set back at the end side and furthermore bears at the end side with its outer surface against the relatively small step 60 of the housing aperture 54. Furthermore, owing to the radial set-back portion, a sealing space is formed between the relatively large step 58 and the centering sleeve 62, into which sealing space an O-ring seal 64 is inserted.

A circuit board 66 is furthermore fastened on the electronics unit housing 18. The electronics unit furthermore has an interface 67 for a supply of electricity and a control line or multiple control lines, for example for setpoint value setting.

Figure 3:
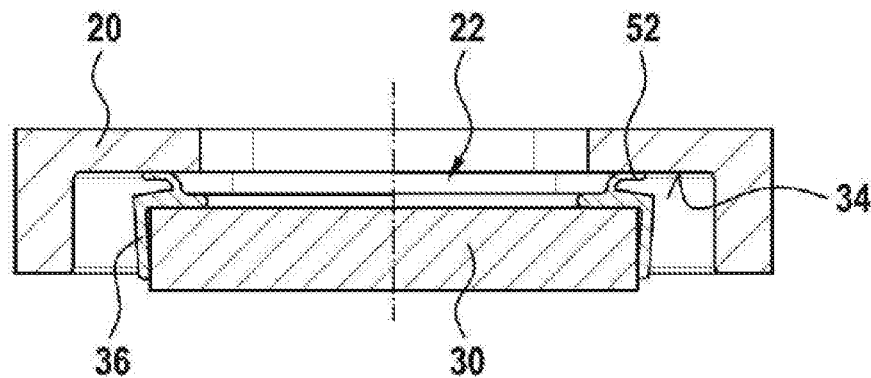
FIG. 3 shows, in a longitudinal section, an interface between the electronics unit housing and the actuator.

FIG. 3 shows the region between the connection pedestal 30 and the housing aperture 22 of the housing pedestal 20 in a longitudinal section. It can be seen how the sealing element 36 engages sealingly around the connection pedestal 30 and bears with its sealing lip 52 against the connection surface 34.

Figure 4:
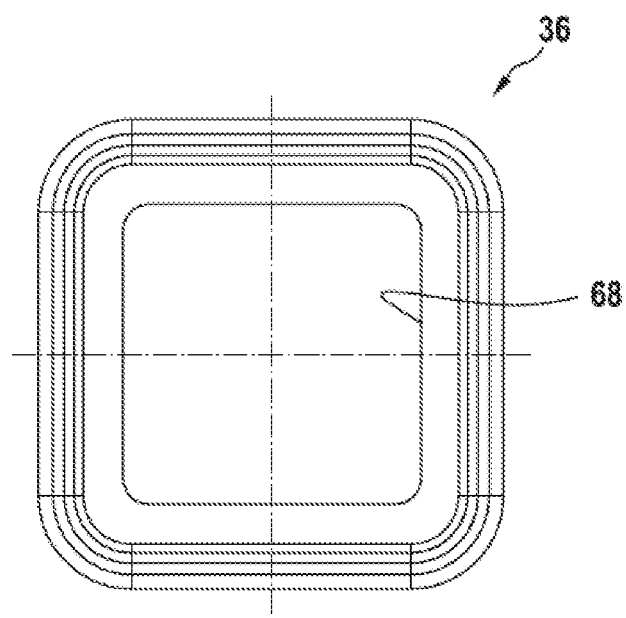
FIG. 4 shows a sealing element in a plan view, FIGS. 5A to 5D each show, in a cross section, a sealing means according to a respective exemplary embodiment.

In FIG. 4, in the plan view, the approximately rectangular form of the sealing element 36 can be seen. Centrally, the sealing element 36 then has an approximately rectangular through-extending aperture 68.

Figure 5A:
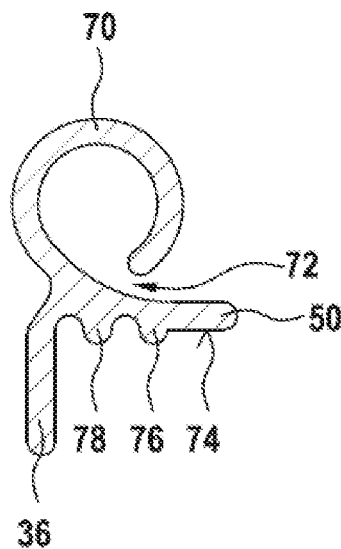

FIG. 5A shows the sealing element 36, wherein, by contrast to FIG. 2, said sealing element has a differently designed sealing lip 70. As viewed in cross section, the sealing lip 70 is of approximately ring-shaped design, wherein it is open toward the inner collar 50 and radially inward by means of an opening 72. It can furthermore be seen that two ring-shaped sealing projections 76 and 78 are formed on the inner collar on its inner collar surface 74 pointing away from the sealing lip 70. Here, the sealing projection 78 has a larger diameter in relation to the sealing projections 76 and surrounds the latter. By means of the sealing projections 76 and 78, the inner collar 50 then bears sealingly against the connection surface 40, see FIG. 2. It is also conceivable for only one of the sealing projections 76 and 78 to be provided. It is furthermore conceivable for the further sealing elements discussed in this application to have one or more such sealing projections 76, 78.

Figure 5B:
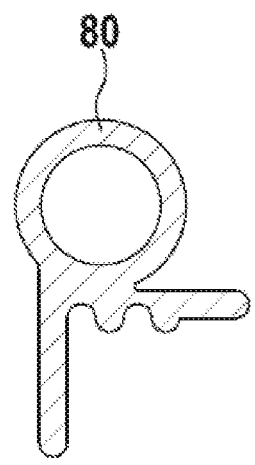

By contrast to the embodiment in FIG. 5A, FIG. 5B shows a sealing lip 80 which is of hollow design and which has a closed, in particular ring-shaped form as viewed in cross section. In the unloaded state, the sealing lip 80 is then of approximately circular-ring-shaped design in cross section.

Figure 5C:
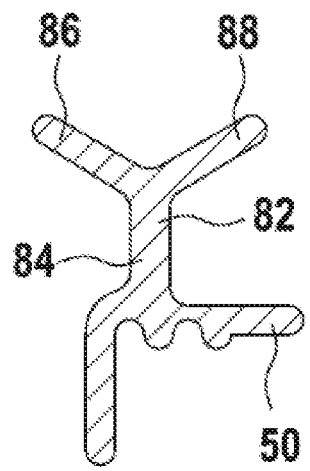

FIG. 5C shows a sealing lip 82 which is of approximately Y-shaped form as viewed in cross section. A main limb 84 of the sealing lip is then connected approximately perpendicularly to the inner collar 50. In the unloaded state, the secondary limbs 86 and 88 extend in approximately V-shaped fashion away from the inner collar 50.

Figure 5D:
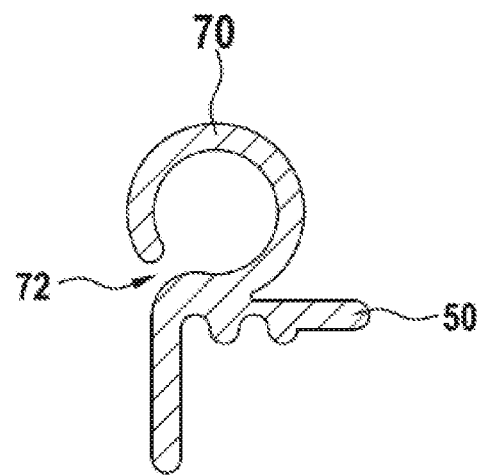

In FIG. 5D, by contrast to the embodiment in FIG. 5A, is open with its sealing lip 70 in a radially outward direction. The opening 72 thus points outward.

Figure 6:
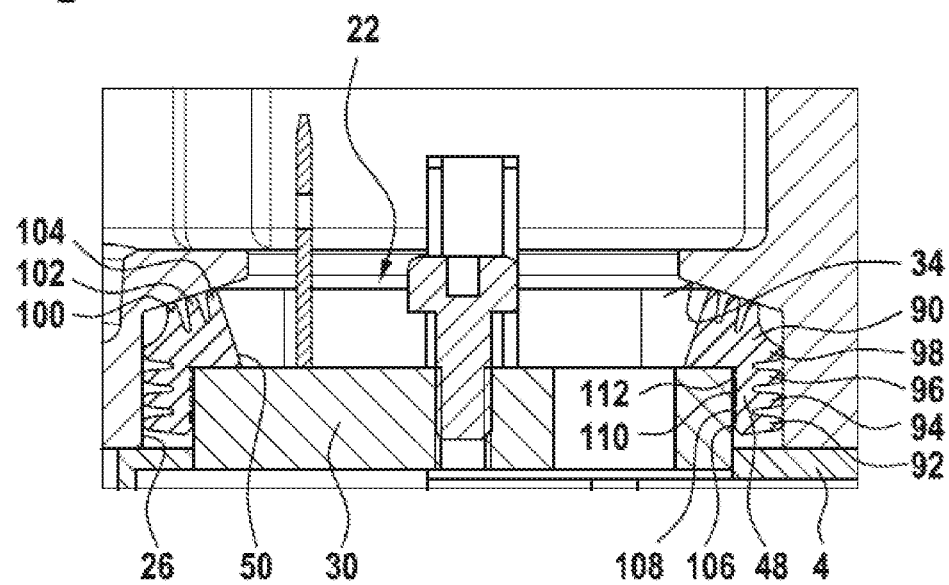
FIG. 6 shows, in a longitudinal section, the interface between the actuator and the electronics unit housing according to a further exemplary embodiment.

FIG. 6 illustrates a further embodiment of a sealing element 90. The sealing portion 48 thereof has, on the outer side, a multiplicity of sealing lips 92 to 98, which are formed so as to run in fully encircling fashion around the sealing portion 48. It is also conceivable for only one or two or three or more than four such sealing lips 92 to 94 to be provided. The sealing lips then bear against the step 26 of the housing aperture 22. Furthermore, on the inner collar 50 of the sealing element 90, on its side pointing away from the connection pedestal 30, there are provided three concentrically formed sealing lips 100, 102 and 104. Here, the sealing lip 100 has the largest diameter and engages around the sealing lips 102 and 104. Sealing lip 102 is then arranged between the sealing lips 100 and 104. The sealing element 90 is then supported by means of the sealing lips 100 to 104 against the abutment surface 34. The latter is in this case of frustoconical design and tapers in a direction away from the connection pedestal 30. The sealing elements 100 to 104 then extend approximately perpendicularly with respect to the frustoconical abutment surface 34. Furthermore, it is provided in FIG. 6 that, alternatively or additionally to the sealing projections 76, 78, see for example FIG. 5A, the sealing element 90 has four ring-shaped sealing projections 106 to 112 which are provided on an inner shell surface of the sealing portion 48. Said sealing projections are arranged one behind the other as viewed in a radial direction of the actuator 4 and are of approximately uniformly encircling design.

Figure 7:
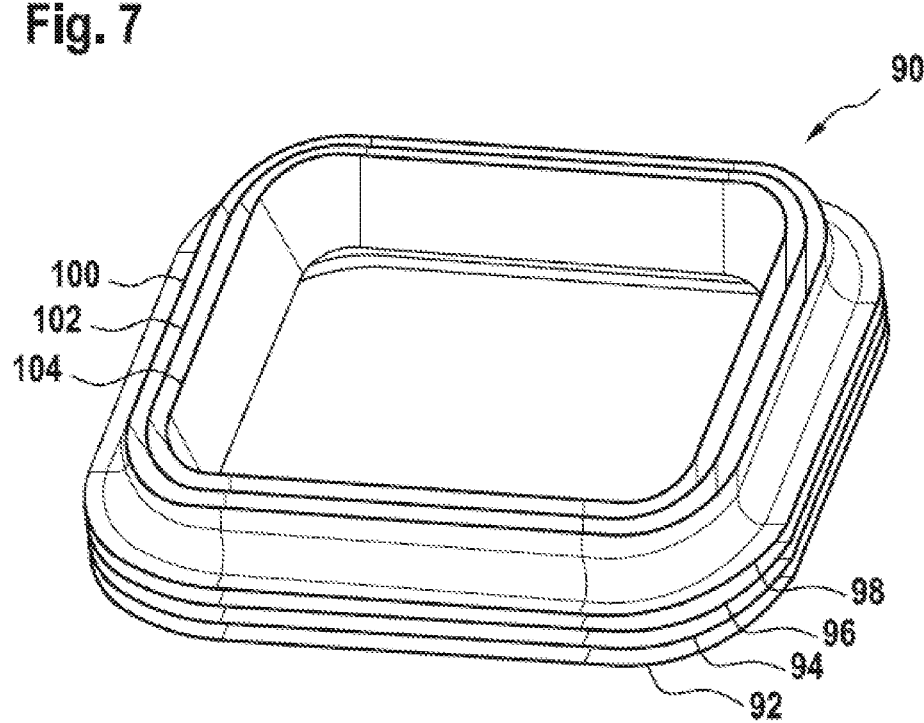
FIG. 7 shows, in a perspective illustration, a sealing means according to a further exemplary embodiment.

FIG. 7 shows the sealing element with its lamellar sealing lips 92 to 98 and 100 to 104.

A valve having a valve housing which is connected to an electronics unit is disclosed. The electronics unit has an electronics unit housing which has an aperture in order to establish electrical contacting with an actuator of the valve. A portion of the actuator may protrude into the aperture. Here, play is provided between the aperture and the portion of the actuator.

What is claimed is:

1. A valve, comprising:
    a valve housing;
    a valve element movably arranged in the valve housing;
    at least one electric actuator fixed to the valve housing and configured to actuate the valve element;
    an electronics unit configured to electronically control the valve;
    an electronics unit housing in which the electronics unit is arranged, the electronics unit housing having a housing pedestal configured to fasten the electronics unit housing to the valve housing, the housing pedestal having a housing aperture via which the at least one electric actuator is electrically connected to the electronics unit and which is arranged opposite the at least one electric actuator; and
    a seal which has a ring shape and which bears outwardly against the housing pedestal and bears inwardly against the actuator,
    wherein the housing aperture has a first step defining a first inner periphery and a second step defining a second inner periphery that is coaxial with and smaller than the first inner periphery, the first and second steps adjoined via a substantially planar abutment surface,
    wherein play in a longitudinal direction of the valve is provided between the housing aperture and at least one component, provided within the housing aperture, of the at least one electric actuator, and
    wherein, throughout the entire provided play, the seal in its entirety has a plurality of longitudinal positions relative to the housing aperture, the seal at each position configured to surround the second inner periphery while bearing against the abutment surface.

2. The valve according to claim 1, wherein an actuator housing of the at least one electric actuator protrudes in certain portions into the first step of the housing aperture.

3. The valve according to claim 1, further comprising:
    a travel sensor which is fastened to one of the at least one electric actuator, a further actuator, and the valve housing and which is arranged axially as viewed in the longitudinal direction of the valve,
    wherein the housing pedestal has a further housing aperture via which the travel sensor is connected to the electronics unit and which is arranged opposite the travel sensor.

4. The valve according to claim 3, wherein a centering element provided on the travel sensor engages into the further housing aperture in order to fix the electronics unit housing axially in the longitudinal direction of the valve.

5. The valve according to claim 1, wherein:
    on an actuator housing of the at least one electric actuator there is formed a connection pedestal which is surrounded by the seal.

6. The valve according to claim 5, wherein:
    the seal has a cylindrical sealing portion which is adjoined by an inner collar,
    the cylindrical sealing portion is configured to engage around the connection pedestal and bears with the inner collar against the connection pedestal.

7. The valve according to claim 6, wherein:
at least one encircling sealing lip is formed on at least one of a collar side of the inner collar pointing away from the connection pedestal and the cylindrical sealing portion, and
the at least one encircling sealing lip is configured to bear against the housing pedestal.

8. The valve according to claim 4, wherein the centering element is formed as a centering sleeve which extends radially away from the travel sensor and protrudes into the further housing aperture.

9. The valve according to claim 3, further comprising:
a sealing element which is arranged with sealing action between the further housing aperture and the travel sensor.

10. The valve according to claim 9, wherein the sealing element is formed as a sealing ring or O-ring seal.

11. The valve according to claim 2, wherein the actuator housing protrudes in certain portions only into the first step of the housing aperture.

12. A valve, comprising:
a valve housing;
a valve element movably arranged in the valve housing;
at least one electric actuator fixed to the valve housing and configured to actuate the valve element;
an electronics unit configured to electronically control the valve;
an electronics unit housing in which the electronics unit is arranged, the electronics unit housing having a housing pedestal configured to fasten the electronics unit housing to the valve housing, the housing pedestal having a housing aperture via which the at least one electric actuator is connected to the electronics unit and which is arranged opposite the at least one electric actuator; and
a seal which has a ring shape and which bears outwardly against the housing pedestal, surrounds the housing aperture, and bears inwardly against the at least one electric actuator,
wherein:
play in a longitudinal direction of the valve is provided between the housing aperture and at least one component, provided within the housing aperture, of the at least one electric actuator,
on an actuator housing of the at least one electric actuator there is formed a connection pedestal which is surrounded by the seal,
the seal has a cylindrical sealing portion which is adjoined by an inner collar, and
the cylindrical sealing portion is configured to engage around the connection pedestal and bears with the inner collar against the connection pedestal.

* * * * *